Figure 4:
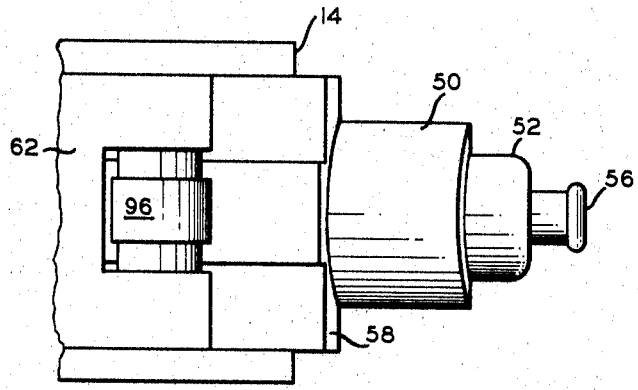

April 22, 1969 C. L. SEEFLUTH 3,439,380
APPARATUS FOR BLOW MOLDING BIAXIALLY ORIENTED ARTICLES
Filed Nov. 7, 1966

INVENTOR.
C. L. SEEFLUTH
BY Young & Quigg
ATTORNEYS

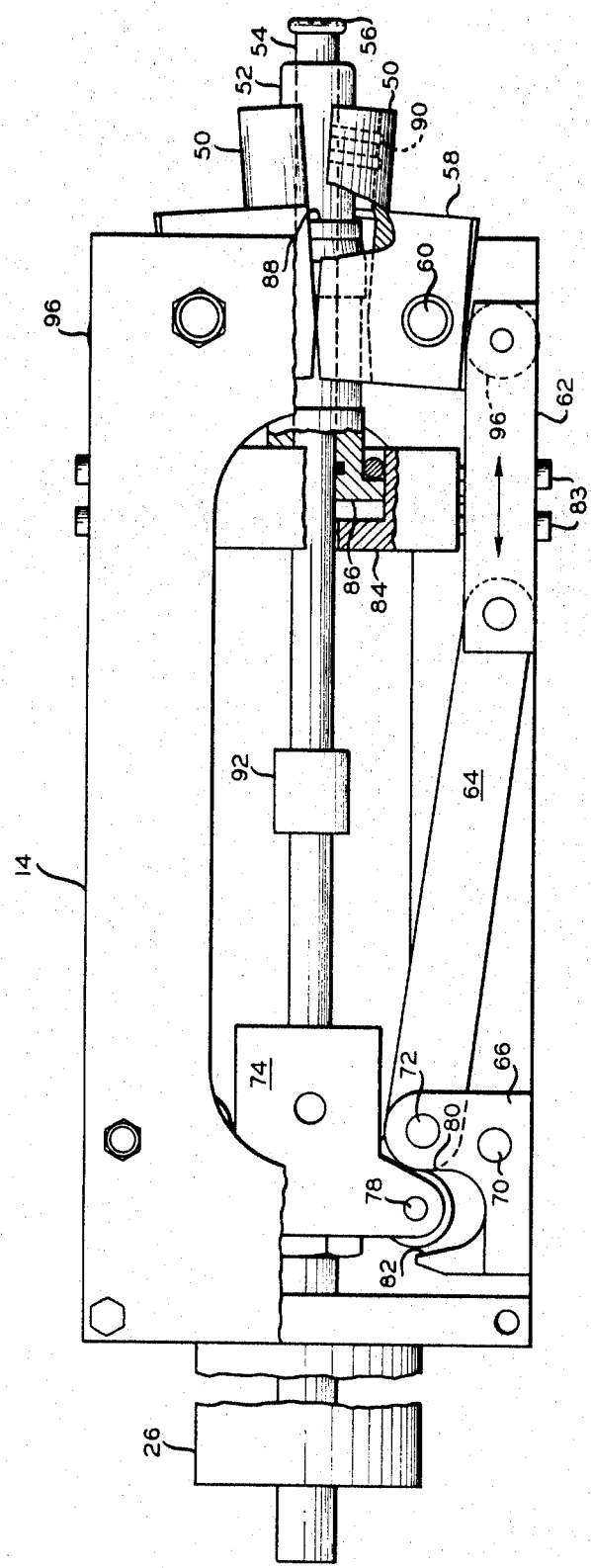

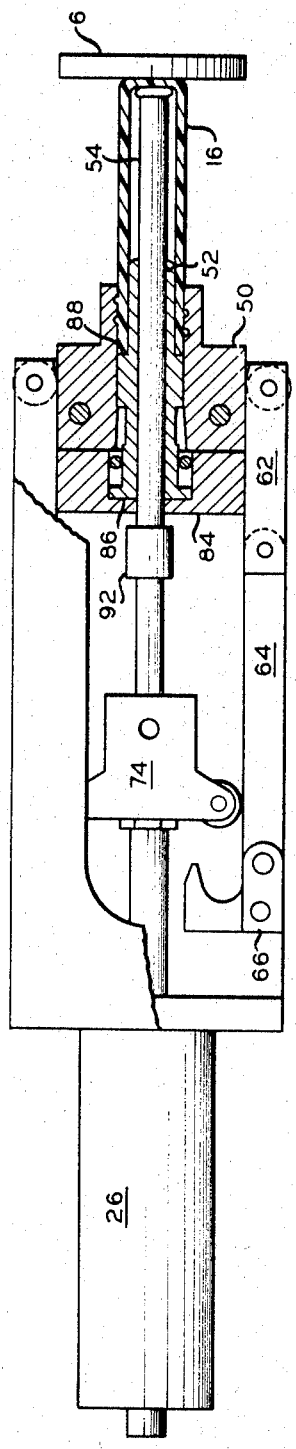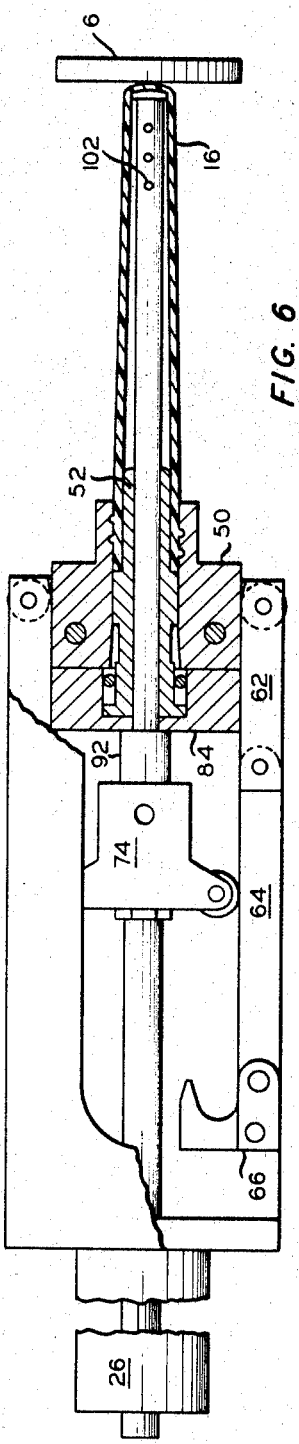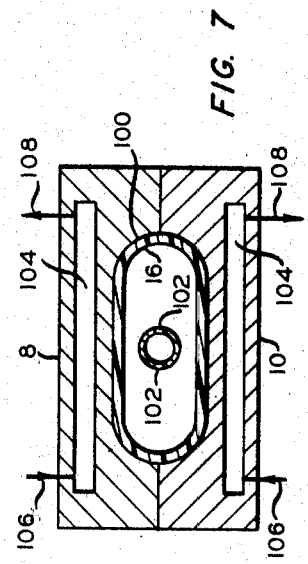

United States Patent Office 3,439,380
Patented Apr. 22, 1969

1

3,439,380
APPARATUS FOR BLOW MOLDING BIAXIALLY ORIENTED ARTICLES
Charles L. Seefluth, Bartlesville, Okla., assignor to Phillips Petroleum Company, a corporation of Delaware
Filed Nov. 7, 1966, Ser. No. 592,503
Int. Cl. B29c 5/06
U.S. Cl. 18—5                                    9 Claims This invention relates to molding biaxially oriented articles. In one of its aspects it relates to an apparatus for blow molding a biaxially oriented article which is non-circular in cross section and in which blowing fluid is blown against an area of normal maximum expansion of the parison.

In another of its aspects the invention relates to an apparatus for pressure molding an article in which mold parts are synchronously moved with a reciprocating parison gripping means.

In another of its aspects the invention relates to an apparatus for producing a biaxially oriented article in which apparatus a gripping means in conjunction with a stretching means are synchronously actuated to stretch the parison to a predetermined length before expansion in a mold of desired shape.

In molding articles which have a non-circular cross-section, there is a problem with excessive thinning of the walls of the article in the areas of maximum expansion of the parison. Normally, a tubular-shaped parison having a circular cross section is used in blow molding the articles. Thus, generally the areas which expand the most have the thinnest wall sections. It is desirable that the wall sections of the finished article have a substantially uniform thickness throughout the cross section. I have discovered that this problem can be avoided by directing the air flow during the blow molding operation against the parison walls which would normally undergo maximum expansion.

In blow molding operations wherein a parison is expanded against the walls of a mold cavity which is composed of separable mold halves, the blow molding pressure is limited by the force by which the mold halves are held together. Generally, air cylinders are used to maintain the mold halves closed. Thus, the pressure in the air cylinder limits the blow molding pressure. I have now discovered that the blow molding pressure can be increased by providing swingable mold halves which are rigidly held in place by a mechanical linkage during the molding operation.

By various aspects of this invention, one or more of the following, or other, objects can be obtained.

It is an object of this invention to provide a novel apparatus for producing a biaxially oriented article.

It is a further object of this invention to provide a novel apparatus for producing a blow molded article which is non-circular in cross section.

It is a still further object of this invention to provide a blow molding apparatus in which mold parts are held together by a rigid yet easily movable means.

It is yet another object of this invention to provide an apparatus having a novel means for gripping and stretching a parison wherein there is provided an interchangeable device for varying the amount of longitudinal stretch given to a parison before lateral stretching of the same to produce a biaxially oriented article.

Other aspects, objects, and the several advantages of this invention are apparent to one skilled in the art from a study of this disclosure, the drawings and the appended claims.

According to the invention, there is provided a novel blow molding apparatus for producing a biaxially oriented article. The apparatus comprises a mold cavity means separable into at least two parts, a means to actuate movement of the separable mold cavity means toward and away from each other, a gripping means for gripping one end of a tubular parison, the gripping means being reciprocatable along a line parallel to a plane of separation of the mold parts and parallel to a longitudinal axis of the mold cavity, a stretch rod extending through the gripping means, one end of the stretch rod adapted to seat against a fixed surface to provide an improved seal in the area in which the parison is pinched off, a spacing means upon the stretch rod to regulate the amount of longitudinal stretch given to the parison before molding commences, and a means for laterally expanding the stretched parison into the mold cavity.

In one embodiment, the lateral expansion means comprises a blowing rod which is incorporated in the stretch rod, the blowing rod having holes which direct an expansion fluid against the parison in the areas of normal maximum expansion.

In another embodiment, the parison is stretched between the gripping means and the end of the stretch rod.

In yet another embodiment, the mold cavity means are actuated toward and away from each other by pivoted linkage arms attached to the mold cavity means at one end thereof and to a rigid member at the other end thereof so that when the mold is closed, the linkage arms are substantially perpendicular to a plane of separation of the mold means so that the pressure inside the mold cavity when the parts are together is transmitted through the arms to the rigid member. The mold cavity means are actuated by the reciprocation of the gripping means.

Figure 1:
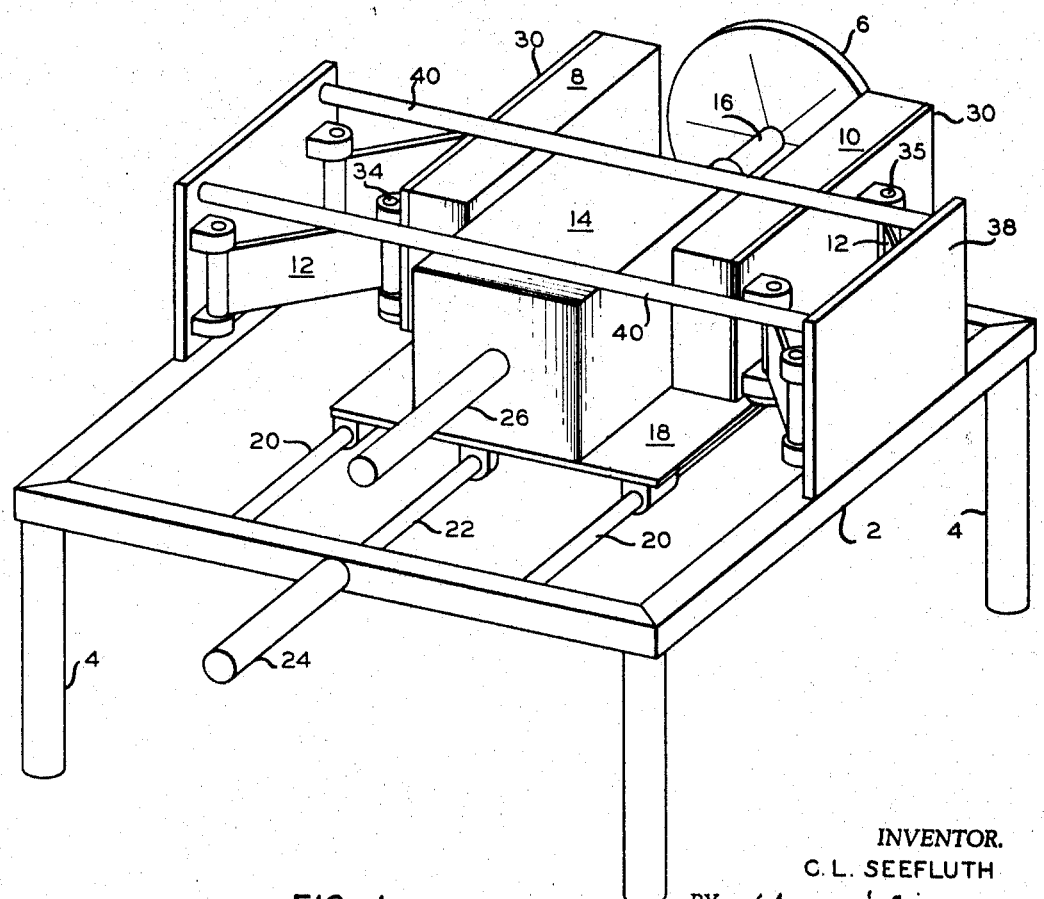
Figure 2:
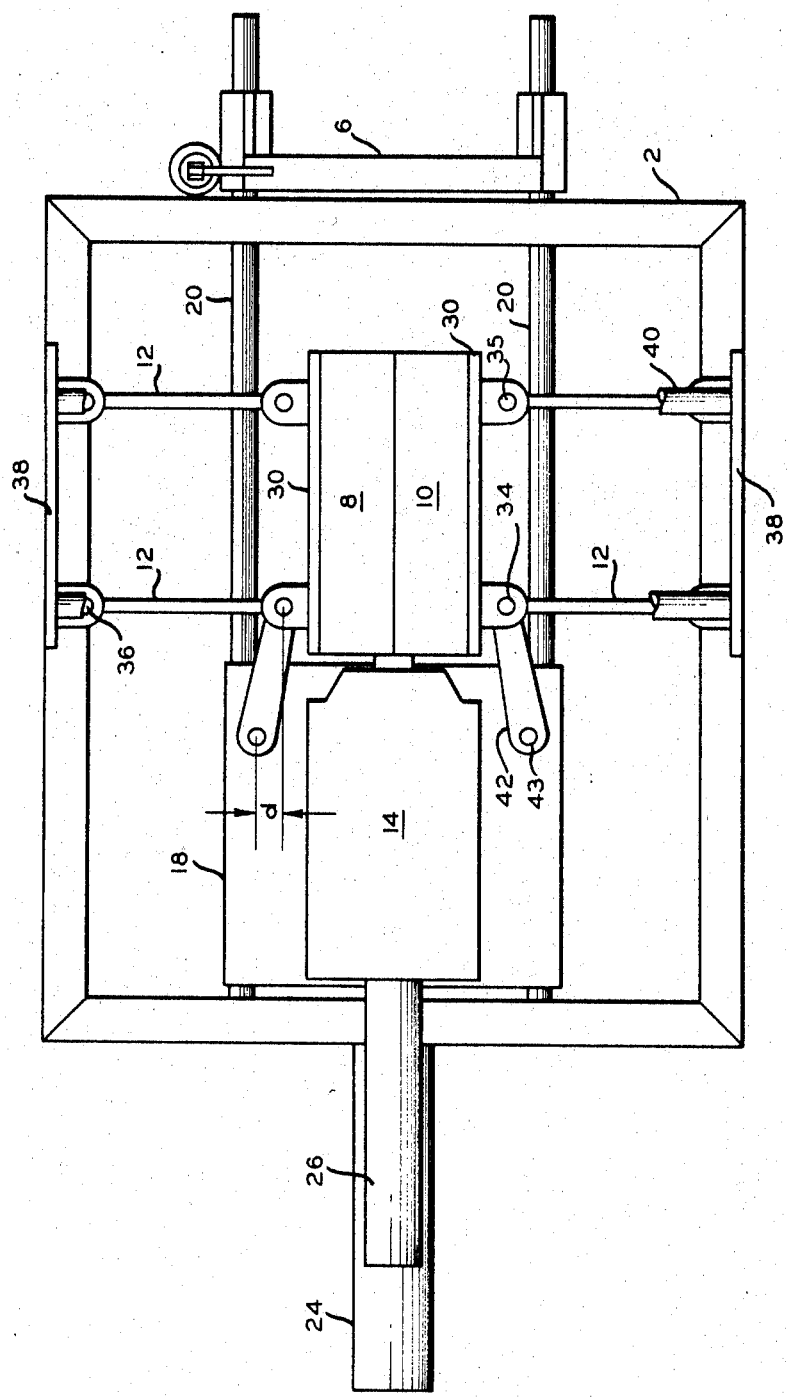

The invention will now be described with reference to the accompanying drawings in which FIGURE 1 is an isometric view of an apparatus according to the invention; FIGURE 2 is a top view of the apparatus shown in FIGURE 1; FIGURE 3 is a detail, partially in section, of a part of the apparatus shown in FIGURES 1 and 2; FIGURE 4 is a top view of the apparatus of FIGURE 3 partly in section; FIGURE 5 is a schematic illustration of the invention at an early stage as applied to a blow molding process; FIGURE 6 is a view similar to FIGURE 5 at a later stage in the process; and FIGURE 7 is a transverse cross-sectional view schematically showing a molded article within a mold cavity.

Referring now to the drawings and to FIGURE 1 in particular, a rectangular frame 2 supported by legs 4 holds the entire molding apparatus. A means for pinching off the parison 6 is supported at the forward end of the frame 2. The pinch-off means can be any suitable means for pinching off the parison into a point. A suitable pinch-off means is disclosed and claimed in application Ser. No. 489,934, filed Sept. 24, 1965. A pair of mold halves 8 and 10 are supported by linkage arms 12 and a fixed plate 38 which plate is connected to frame 2. A blowing head 14 with a means to grip one end of a tubular parison is supported on support plate 18 which is reciprocatable on tracks 20. Actuation of the gripping means and stretching means (not shown) for parison 16 is by way of air cylinder 26. Actuation of the support plate 18 which aids in the stretching process as well as serves to close the mold halves 8 and 10 around parison 16 is by way of air cylinder 24 through rod 22.

Referring now to FIGURE 2, wherein the mold halves are shown in closed position, mold halves 8 and 10 are rigidly fastened to plates 30. Pins 34 connect linkages 12 and 42 to plates 38 and 18 respectively near one end of the plates 30. Linkage 12 is connected at the top of pin 34 and linkage 42 at bottom of pin 34. Pins 35 connect linkages 12 to plates 38 at the opposite end of the plates 30. Linkage 12 is connected to pin 36 which allows the linkage to pivot about that point. Pin 36 is rotatably connected to plate 38 which in turn is connected to frame 2. Plates 38 are maintained in fixed relationship by support members 40 which extend across the apparatus. Linkage 42 is pivotably connected to plate 18 by pin 43.

In operation, blowing head 14 is moved up to the position shown in FIGURE 1. A gripping means (not shown) grips one end of a tubular parison 16 which is inserted through pinch-off means 6. The parison is pinched off, a stretch rod (not shown) is seated against the end of the parison 16 pressing it against the pinchoff means 6 to provide a seal in the pinch-off area and the parison is stretched by moving support plate 18 backward toward the position shown in FIGURE 2. The parison after being stretched a predetermined length is then moved back with the movement of plate 18, blowing head 14 and the stretch rod (not shown). The movement of plate 18 causes mold halves 8 and 10 to swing from the position shown in FIGURE 1 to the position shown in FIGURE 2, enclosing the parison. Blowing of the parison is then commenced. As can be seen from the drawing, the pressure against mold halves 8 and 10 is transmitted through linkages 12 to fixed plate 38. This mechanical linkage allows increased molding pressure to be used. As is obvious to one skilled in the art, no power is required to hold the mold closed during the blowing operation. Further, articles with inset bottoms can be readily dislodged from the mold due to the differences in axial speed of mold and blowing head during the initial opening of the mold. The mold speed is greater than the blowing head speed and the forward and outward movement of the opening mold halves removes the same from the article, thereby freezing it. Other articles can be dislodged from the gripping means more easily because of the initial movement of the mold forwardly and outwardly relative to the gripping means. The initial forward movement of the mold relative to the gripping means will pull against the formed article thereby dislodging it from the gripping means. The article can also be removed from the mandrel 52 by forcing a pulse of air through the blowing rod 54 after the mold halves (8 and 10) have opened.

The novel arrangement of linkages 42 and 12 also provides for proper seating of the unblown parison 16 within the mold cavity without the scraping of the end of the parison with the mold halves as they are closing. This clearing of the parison by the mold halves is accomplished by placing pin 43 a distance $d$ to the outside of pins 34 and 35 wherein the mold halves are closed (see FIGURE 2). When the mold halves are opened as shown in FIGURE 1, there is an overlapping relationship of mold halves 8 and 10 with blowing head 14. Thus in order for the mold halves to close around the parison 16, there must be a relative axial movement of blowing head 14 away from mold halves 8 and 10. This relative movement of the blowing head 14 away from mold halves 8 and 10 takes place as blowing head 14 begins to move backward, i.e. away from pinch off device 6. The relative movement away from one another will continue until pins 34 and 35 become aligned with the line of movement of pins 43 (see FIGURE 2). At this point the mold halves will have cleared the parison 16 and the mold halves begin a relative movement toward blowing head 14. As is understood by one skilled in the art, the movement of both the mold halves and the blowing head will be in the same direction with respect to the pinch off device 6.

This relative motion of the mold halves 8 and 10 toward the blowing head 14 serves to seat the parison at the end of the mold cavity as the mold halves are closing while avoiding the scraping of the parison by the mold halves during the closing operation.

The distance C, which distance the mold halves and the blowing head move toward each other, can be varied by varying the distance $d$ according to the following relationship $$C = L - (L^2 - d^2)^{1/2}$$

where L is the length of member 42 and C and $d$ are defined above.

The novel arrangement of linkages 42 and 12 aids in removing the blown articles from the mold. This arrangement causes the mold to move axially away from the gripping means initially as the mold halves open as has been hereinbefore described.

Referring now to FIGURE 3 and FIGURE 4, wherein the gripping and parison stretching means are shown, there is provided a gripping means comprising die members 50 having interior thread forming means 90 connected to a support plate 58 which is rotatable about pin 60. Die members 50 clamp the parison onto mandrel 52. A stretching and blowing rod 54 having a sealing foot 56 extends through the central portion of mandrel 52 and is shown in FIGURES 3 and 4 in retracted position. Die members 50 are actuated to close about the parison by the movement of yoke 62 which forces roller 96 against plate 58 and causes it to rotate about pin 60 so that the die members 50 clamp down on the parison surrounding mandrel 52. Yoke 62 is actuated to reciprocate by linkage 64 which is connected by pin 72 to plate 66 which rotates about pin 70. The rotation of plate 66 causes linkage 64 to push forward yoke 62. Rotation of plate 66 is caused by the forward movement of member 74 which is attached to the upper end of blowing and stretching rod 54 and is actuated by air cylinder 26. Member 74 has a cam follower 76 which is rotatable about pin 78 and bears against surface 80 of member 66 thereby causing a clockwise rotation of that plate. When it is desirable to release the parison from gripping means 50, after plate 66 has rotated clockwise 90° from that shown in FIGURE 3, member 74 moves back and causes cam follower 76 to bear against surface 82 thereby causing a 90° counterclockwise rotation of plate 66 about pin 70. Upon the forward movement of yoke 62, member 84 connected to yoke 62 through bolts 83, is actuated to move forward and press against surface 86 of mandrel 52. This forward movement of mandrel 52 causes surface 88 of mandrel 52 to squeeze the parison material within the closed die members 50 into the thread forming areas 90 of die members 50 thereby giving a superior neck and lip in a blow molded bottle. A tubular element 92 is placed around blowing and stretching rod 54 between member 84 and member 74 to limit the longitudinal stretch of a parison which is stretched by rod 54. As can be seen from the drawing and as obvious to one skilled in the art, the extent of stretching of the parison 16 can be varied by changing the length of tubular member 92. The function of tubular member 92 as well as the longitudinal stretching of the parison 16 can be seen in FIGURES 5 and 6.

Referring now to FIGURES 5 and 6, a tubular parison 16 is pinched off by pinch-off member 6. Blowing and stretching rod 54 with foot 56 seats in the pinch-off area of parison 16 thereby giving an improved seal in the pinch-off area and presses against pinch-off means 6. As can be seen from FIGURE 5, in this position, although stretching and blowing rod 54 is extended to contact pinch-off means 6, some space is left between member 74 and member 84. The space is not taken up in entirety by tubular member 92. In this position shown in FIGURE 5, die members 50 have been actuated to clamp down on an end portion of parison 16 to hold it between die members 50 and mandrel 52. At this point, air cylinder 24 is actuated to move plate 18 backwardly thereby drawing the gripping means backward. Since air cylinder 26 is still actuated to force rod 54 against pinch-off means 6, blowing rod 54 remains stationary while the gripping mechanism moves backwardly. During this backward movement of the parison gripping means, parison 16 will be stretched until tubular member 92 contacts member 74 at one end and member 84 at the other end as shown in FIGURE 6. At this point, the whole mechanism will move backward under the action of air cylinder 24 until it reaches the position shown in FIGURE 2 at which point the mold will have closed about the parison and blowing can commence. As can be seen from FIGURES 6 and 7, the blow holes 102 in the blowing and stretching rod 54 are directed outwardly against the parison in the area of normal maximum expansion. Preferably, the fluid used for the blowing operation is at a temperature less than the temperature of the parison and below the orientation temperature of the parison. Thus, the impingement of the blowing fluid against the parison will cause the parison to be cooled, thereby giving it more resistance to stretch at those points.

Referring to FIGURE 7, mold halves 8 and 10 have temperature regulation means 104 with means for introducing a fluid 106 and means for removing a fluid 108. As is understood by one skilled in the art, the temperature conditioning means can employ heating or cooling fluid or the mold can be electrically heated. The action of fluid pressure through holes 102 against the interior of the parison 16 causes the parison to expand against interior mold surface 100 of mold cavities 8 and 10. As has been hereinbefore pointed out, the directing of the blowing fluid against the parison wall in the areas of normal maximum expansion will cause the parison in these areas to be stretched about the same as the parison in the other areas of the mold giving an article having a substantially constant thickness in cross section.

Whereas the invention has been described with reference to a horizontally disposed blow molding apparatus, it is obvious that the apparatus can take other forms and be vertically disposed. Also, it is within the skill of the art to use vacuum molding instead of blow molding with certain embodiments of the invention.

An apparatus according to the invention has a suitable timing means which actuates the air cylinders shown in FIGURES 1–4. At the beginning of the cycle the support plate is forward near the pinch-off device 6. In particular, the timer activates air cylinder 26 to move blowing and stretching rod 54 with foot 56 toward pinch-off device 6, thereby also activating die members 50 to close against the end of a tubular parison at a first interval of time, the parison also being pinched into a point during the first interval of time; air cylinder 24 to retract plate 18 away from pinch-off device 6 at a second interval of time, thereby stretching the parison and causing mold halves 8 and 10 to close around the stretched parison, the parison being finally pinched off by the pinch-off device 6 during this interval; an air supply means to supply air to the inner portion of the parison through stretching and blowing rod 54 at a third interval of time, the air supply means to cease blowing at a fourth interval of time and releasing the air pressure within the blown article; air cylinder 24 to move support plate 18 toward pinch-off device 6 at a fifth interval of time thereby opening the mold halves; air cylinder 26 to retract stretching and blowing rod 52 at a sixth interval of time, thereby also opening gripping die members 50; and activating the air supply means at a seventh interval of time to blow said blow molded article from mandrel 52.

Reasonable variation and modification are possible within the scope of the foregoing disclosure, the drawings, and the claims to the invention without departing from the spirit thereof.

I claim:
1. An apparatus for molding a biaxially oriented article comprising:
   (a) mold cavity means separable into at least two parts,
   (b) means to actuate movement of said separable mold cavity means toward and away from each other,
   (c) gripping means for gripping one end of a tubular parison,
   (d) actuating means for said gripping means to reciprocate said gripping means along a line parallel to a plane of separation of said mold parts and parallel to a longitudinal axis of the mold cavity,
   (e) said gripping means being actuated into and out of a mold cavity area, said actuating means also causing said gripping means to clamp around said parison,
   (f) a stretching rod extending through said gripping means, one end of said rod adapted to seat against a parison which is pinched off in the pinch-off area and to force said parison against a fixed surface to thereby provide an improved seal in the pinch-off area of said parison,
       (1) said stretch rod adapted to move axially from an extended position in which said one end is seated against said fixed surface to a retracted position in which said one end is adjacent said gripping means,
       (2) actuating means for said stretch rod at a second end thereof,
   (g) spacing means on said stretch rod between said actuating means and said gripping means to limit the extent to which gripping means can be pulled away from said one end of said stretch rod thereby determining the amount of longitudinal stretching given to said parison,
   (h) support means for holding said gripping means, said gripping actuating means, said stretch rod and said stretch rod actuating means,
       (1) an actuating means for said support means to reciprocate the same along said line parallel to the plane of separation of said mold halves.

2. An apparatus according to claim 1 wherein the shape of the mold cavity means is non-circular in cross section at at least one point along the mold axis, and there is provided a plurality of holes extending along said stretching rod, and a means to supply fluid pressure to the interior of said stretching rod, said holes being concentrated in areas of maximum expansion of the parison so that as the parison is blown, those areas next to said holes will cool slightly to thereby prevent excessive thinning of said parison in said areas of maximum expansion.

3. An apparatus according to claim 1 wherein said means to actuate the movement of said separable mold cavity means comprises pivotal linkage arms pivotably attached to said mold cavity means at one end thereof and to a rigid member at the other end thereof so that when said mold cavity means is closed, said linkage arms are perpendicular to a plane of separation of said mold means such that pressure inside said mold cavity means when said parts are together is transmitted through said arms to said rigid member, and said linkage means are connected to said mold parts and to said support means so that reciprocable movement of said support means causes said mold parts to swing toward and away from each other.

4. An apparatus according to claim 1 wherein said gripping means comprises at least two pivotable die members, said die members contain a neck and thread forming means for a bottle, said gripping and actuating means comprising a slidable cam means to bear against said pivotable die members to cause the same to close, a locking member pivotable about a point and having a cam surface, a connecting link between another point of said locking member and said slidable cam so that when said locking member is in a first position, said slidable cam is retracted and said members are opened, and rotation of said locking member to a second position causes said slidable cam to extend to cause said died member to close, and cam means to contact said locking member cam surface to rotate said locking means into said first position and said second position.

5. An apparatus according to claim 4 wherein there is provided a means connecting said stretch rod actuating means to said cam actuating means so that when said stretch rod is first actuated from said retracted position, said cam actuator means actuates said locking means to rotate from said first position to said second position and when said stretching rod is actuated into said retracted position from said extended position, said cam actuator means actuates said locking means to rotate from said second position to said first position.

6. An apparatus according to claim 3 wherein there is provided a pivotable member between said support means of (h) and at least one of said mold cavity means of (a) and wherein said pivotable member and said pivoted linkage arms are so positioned such that during the closing of said mold cavity means of (a), said mold cavity means of (a) moves axially with respect to the movement of said girpping means of (d) away from said gripping means until said parison has cleared said parts of said mold cavity means, and then toward said gripping means to seat the end of said parison at an end of said mold cavity means; and that during the opening of said mold cavity means of (a), said mold cavity means of (a) initially moves axially with respect to said gripping means of (d) away from said gripping means to aid in dislodging a blown article from said gripping means.

7. An apparatus according to claim 4 wherein said gripping means also comprises a mandrel extending into the central area of said pivotable die members adapted to be inserted inside said parison so that said parison is clamped between said die members and said mandrel, and a means connected to said slidable cam means to actuate said mandrel to move into said mold cavity, said mandrel having an annular shoulder which cooperates with said die members when closed to squeeze parison material in said die members, therby forcing the parison material into said die areas to form threads.

8. An apparatus according to claim 1 wherein said one end of said stretch rod has a flat surface perpendicular to the axis of the stretch rod adapted to seat against the parison in said area in which said parison is pinched off to provide an improved seal.

9. An apparatus according to claim 2 wherein said gripping means comprises at least two pivotable die members, said die members containing a neck and thread forming means for a bottle, and a mandrel extending into the central area of the said pivotable die members adapted to be inserted inside said parison so that said parison is clamped between said died members and said mandrel, wherein initially said support means is near said pinch off means and there is further provided a timer means to actuate:

(a) said stretch rod actuating means at a first interval of time to move the same toward said pinch off means, and thereby activating said gripping means to grip the end of said parison,
(b) said support means to be retracted at a second interval of time,
(c) a blowing means at a third interval of time to force air into the inside of said parison through said blowing means,
(d) said blowing means to cease the introduction of air at a fourth interval of time,
(e) movement of said support means toward said pinch-off means at a fifth interval of time, thereby opening said mold means,
(f) said actuating means for said stretch rod during a sixth interval of time to retract said stretch rod and thereby open said gripping means, and
(g) said blowing means to supply air to said blowing rod at a seventh interval of time to force said blown article off said mandrel.

References Cited

UNITED STATES PATENTS

| 3,305,158 | 2/1967 | Whiteford | 18—19 X |
| 3,324,509 | 6/1967 | Hey et al. | 18—30 X |
| 3,341,644 | 9/1967 | Allen | 264—97 |

FOREIGN PATENTS 642,609  5/1964  Belgium.

WILBUR L. McBAY, *Primary Examiner.*

U.S. Cl. X.R.

264—94